(12) United States Patent
Yang et al.

(10) Patent No.: US 10,923,106 B2
(45) Date of Patent: Feb. 16, 2021

(54) METHOD FOR AUDIO SYNTHESIS ADAPTED TO VIDEO CHARACTERISTICS

(71) Applicant: Korea Electronics Technology Institute, Seongnam-si (KR)

(72) Inventors: Jong Yeol Yang, Yongin-si (KR); Young Han Lee, Yongin-si (KR); Choong Sang Cho, Seongnam-si (KR); Hye Dong Jung, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 121 days.

(21) Appl. No.: 16/256,835

(22) Filed: Jan. 24, 2019

(65) Prior Publication Data
US 2020/0043465 A1 Feb. 6, 2020

(30) Foreign Application Priority Data
Jul. 31, 2018 (KR) .................. 10-2018-0089138

(51) Int. Cl.
*G10L 13/00* (2006.01)
*G10L 13/10* (2013.01)
(Continued)

(52) U.S. Cl.
CPC .......... *G10L 13/10* (2013.01); *G06K 9/00744* (2013.01); *G06K 9/00765* (2013.01); *H04N 21/233* (2013.01)

(58) Field of Classification Search
CPC ......... G10L 13/08; G10L 13/06; G10L 13/00; G10L 13/10; G10L 21/003; G10L 13/033;
(Continued)

(56) References Cited

U.S. PATENT DOCUMENTS 6,366,885 B1 * 4/2002 Basu .................. G11B 27/031
704/235
6,539,354 B1 * 3/2003 Sutton .................. G10L 21/06
345/423
(Continued)

FOREIGN PATENT DOCUMENTS

JP 2005-181998 A 7/2005
KR 10-2006-0090687 A 8/2006

OTHER PUBLICATIONS

Curinga et al, "Lip movements synthesis using time delay neural networks." 1996, In 8th European Signal Processing Conference (EUSIPCO 1996). IEEE, 1996, pp 1-4.*
(Continued)

*Primary Examiner* — Olujimi A Adesanya
(74) *Attorney, Agent, or Firm* — NSIP Law

(57) ABSTRACT

An audio synthesis method adapted to video characteristics is provided. The audio synthesis method according to an embodiment includes: extracting characteristics x from a video in a time-series way; extracting characteristics p of phonemes from a text; and generating an audio spectrum characteristic $S_t$ used to generate an audio to be synthesized with a video at a time t, based on correlations between an audio spectrum characteristic $S_{t-1}$, which is used to generate an audio to be synthesized with a video at a time t−1, and the characteristics x. Accordingly, an audio can be synthesized according to video characteristics, and speech according to a video can be easily added.

11 Claims, 3 Drawing Sheets

(51) Int. Cl.
*H04N 21/233* (2011.01)
*G06K 9/00* (2006.01)

(58) Field of Classification Search
CPC . G10L 13/047; G10L 15/04; G10L 2015/025; G10L 13/04; G10L 13/07; G10L 21/06; G10L 21/10; G06T 13/40; G06T 19/006; G06T 2200/04; G06T 2213/08; G06F 3/013; G06F 3/012; G06N 20/00; G06N 3/08

See application file for complete search history.

(56) References Cited

U.S. PATENT DOCUMENTS

| | | | | |
|---|---|---|---|---|
| 8,913,189 | B1* | 12/2014 | Mincher | H04N 21/4394 348/515 |
| 9,959,368 | B2* | 5/2018 | Kolluru | G06F 16/90335 |
| 2004/0120554 | A1* | 6/2004 | Lin | G06K 9/00335 382/118 |
| 2006/0009978 | A1* | 1/2006 | Ma | 704/266 |
| 2006/0290699 | A1* | 12/2006 | Dimtrva | H04N 21/42203 345/473 |
| 2009/0044112 | A1* | 2/2009 | Basso | G06T 13/80 715/706 |
| 2012/0130717 | A1* | 5/2012 | Xu | H04L 51/10 704/258 |
| 2013/0124206 | A1* | 5/2013 | Rezvani | G06T 13/40 704/270 |
| 2014/0210830 | A1* | 7/2014 | Latorre-Martinez | G06T 13/80 345/473 |
| 2016/0180833 | A1* | 6/2016 | Tanaka | G10L 13/0335 704/260 |
| 2017/0178346 | A1* | 6/2017 | Ferro | G06K 9/6274 |

OTHER PUBLICATIONS

Korean Office Action dated Jun. 30, 2019 in corresponding Korean Patent Application No. 10-2018-0089128 (2 pages in English, 5 pages in Korean).

* cited by examiner

METHOD FOR AUDIO SYNTHESIS ADAPTED TO VIDEO CHARACTERISTICS

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Jul. 31, 2018, and assigned Serial No. 10-2018-0089128, the entire disclosure of which is hereby incorporated by reference.

TECHNICAL FIELD OF THE INVENTION

The present disclosure relates generally to an audio/speech synthesis method, and more particularly, to a method for synthesizing audio/speech according to a video which changes with time.

BACKGROUND OF THE INVENTION

Speech synthesis refers to technology for producing speech of a specific speaker based on an inputted text, and to achieve this, uses an artificial intelligence (AI) model which learns speech characteristics of the speaker. However, this does not consider a video environment.

Accordingly, when synthesized speech should be added to a video for the purpose of dubbing, a process of converting the speech to synchronize the video and the speech is required. This process is performed by a manual operation.

However, the process of adding the speech to the video manually may be cumbersome and difficult to perform, and may require much time. Accordingly, there is a need for a method for audio synthesis adapted to video characteristics.

SUMMARY OF THE INVENTION

To address the above-discussed deficiencies of the prior art, it is a primary object of the present disclosure to provide a method for synthesizing an audio according to video characteristics, which can easily add speech to a video.

In addition, another object of the present disclosure is to provide a method for converting synthesized speech according to video characteristics and adding the speech to a video.

According to one aspect of the present disclosure to achieve the above-described objects, an audio synthesis method includes: receiving an input of a video; receiving an input of a text; extracting characteristics x from the video in a time-series way; extracting characteristics p of phonemes from the text; and generating an audio spectrum characteristic $S_t$ used to generate an audio to be synthesized with a video at a time t, based on correlations between an audio spectrum characteristic $S_{t-1}$, which is used to generate an audio to be synthesized with a video at a time t−1, and the characteristics x.

In addition, the generating may include: a first calculation step of calculating scores e based on the correlations between the audio spectrum characteristic $S_{t-1}$ used to generate the audio to be synthesized with the video at the time t−1, and the respective characteristics x; and a first generation step of generating the audio spectrum characteristic $S_t$ by using the calculated scores e.

In addition, the first calculation step may be performed by using an AI model which is trained to receive the audio spectrum characteristic $S_{t-1}$ and the respective characteristics x, and to calculate and output the scores e based on the correlations therebetween.

In addition, the first generation step may include: a second calculation step of calculating weights a to be applied to the characteristics x by using the calculated scores e; and a second generation step of generating the audio spectrum characteristic $S_t$ by using the calculated weights a.

In addition, the second calculation step may be performed by using an AI model which is trained to receive the calculated scores e and to calculate and output the weights a to be applied to the characteristics x.

In addition, the second generation step may include: calculating a weight sum $Z_t$ of the scores e by using the calculated weights a; and generating the audio spectrum characteristic St used to generate the audio to be synthesized with the video at the time t, by using the audio spectrum characteristic $S_{t-1}$ and the weight sum $Z_t$.

In addition, the audio synthesis method according to an embodiment of the present disclosure may further include generating an audio $y_t$ until the time t by adding an audio generated by using the audio spectrum characteristic St to an audio $y_{t-1}$ until the time t−1.

In addition, the audio synthesis method according to an embodiment of the present disclosure may further include adding the audio $y_t$ until the time t to a video until the time t.

In addition, the audio synthesis method according to an embodiment of the present disclosure may further include converting the generated audio spectrum $S_t$.

According to another aspect of the present disclosure, an audio synthesis system includes: an input unit configured to receive input of a video and a text; and a processor configured to extract characteristics x from the video in a time-series way, to extracting characteristics p of phonemes from the text, and to generate an audio spectrum characteristic $S_t$ used to generate an audio to be synthesized with a video at a time t, based on correlations between an audio spectrum characteristic $S_{t-1}$, which is used to generate an audio to be synthesized with a video at a time t−1, and the characteristics x.

According to still another aspect of the present disclosure, an audio synthesis method includes: extracting characteristics x from a video in a time-series way; extracting characteristics p of phonemes from a text; and generating an audio spectrum characteristic $S_t$ used to generate an audio to be synthesized with a video at a time t, based on correlations between an audio spectrum characteristic $S_{t-1}$, which is used to generate an audio to be synthesized with a video at a time t−1, and the characteristics x.

According to yet another aspect of the present disclosure, an audio synthesis system includes: a first extraction unit configured to extract characteristics x from a video in a time-series way; a second extraction unit configured to extract characteristics p of phonemes from a text; and a generator configured to generate an audio spectrum characteristic $S_t$ used to generate an audio to be synthesized with a video at a time t, based on correlations between an audio spectrum characteristic $S_{t-1}$, which is used to generate an audio to be synthesized with a video at a time t−1, and the characteristics x.

According to embodiments of the present disclosure described above, an audio can be synthesized according to video characteristics, and speech according to a video can be easily added. In addition, the speech can be converted according to the video characteristics such that speech more adapted to the video characteristics can be added.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Hereinafter, the present disclosure will be described in detail with reference to the accompanying drawings.

Figure 1:
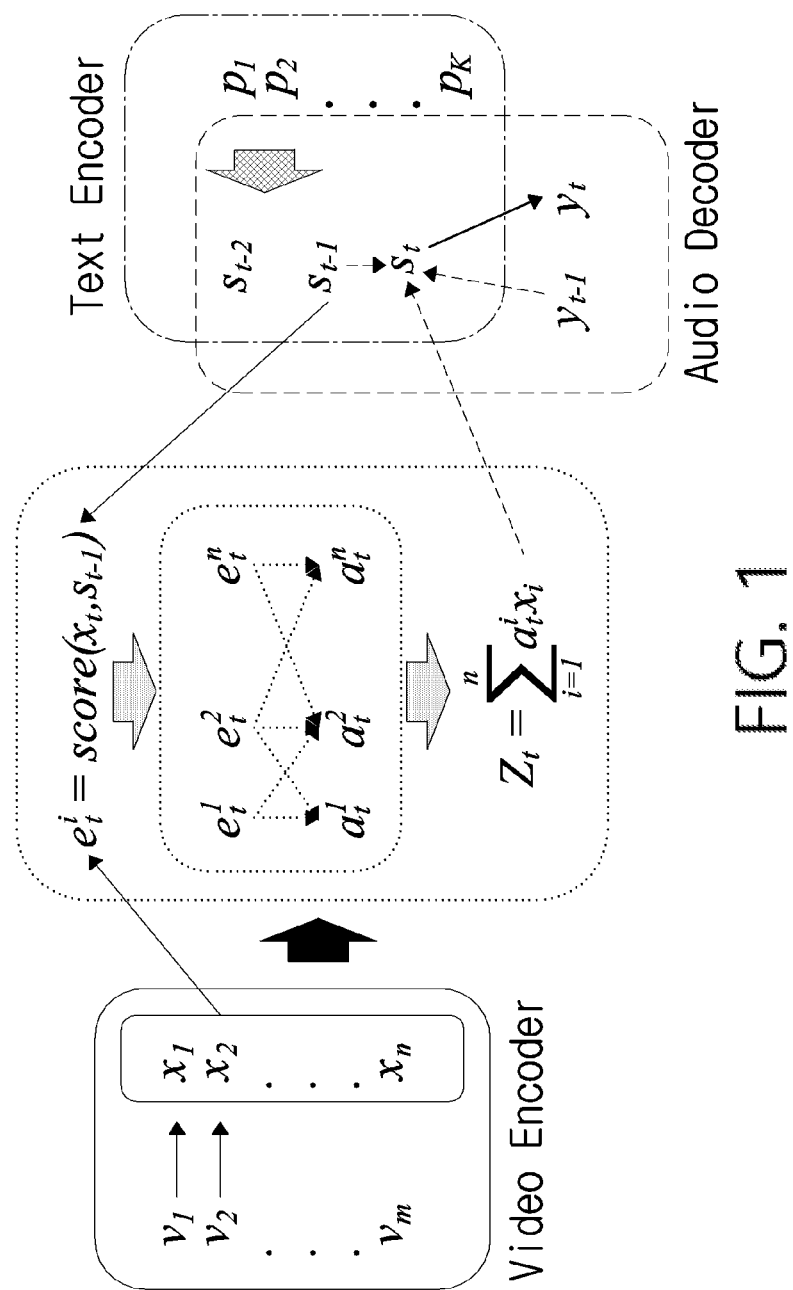
FIG. 1 is a view provided to explain a speech synthesis method according to an embodiment of the present disclosure.

FIG. 1 is a view provided to explain a speech synthesis method according to an embodiment of the present disclosure. The speech synthesis method according to an embodiment synthesizes speech according to given input video characteristics by using an AI model.

Specifically, the speech synthesis method according to an embodiment synthesizes speech from a text to synchronize with an environment of an input video, specifically, a length of the video and the shape of mouth of a speaker.

To achieve this, n number of characteristics $x_1, x_2, \ldots, x_n$ are extracted in a time-series way from input videos $v_1, v_2, \ldots, v_m$ having a length of m. The characteristics $x_1, x_2, \ldots, x_n$ are characteristics regarding the shape of mouth of a speaker appearing in the videos $v_1, v_2, \ldots, v_m$, and are extracted by a video encoder.

In addition, characteristics $p_1, p_2, \ldots, p_k$ regarding k number of phonemes forming an input text to be synthesized into speech are extracted. The phoneme characteristics $p_1, p_2, \ldots, p_k$ are extracted by a text encoder.

Next, scores $e_t^1, e_t^2, \ldots, e_t^n$ are calculated based on correlations between an audio spectrum characteristic $S_{t-1}$ used to generate an audio to be added to a video at a time t−1, and the respective mouth shape characteristics $x_1, x_2, \ldots, x_n$.

The scores $e_t^1, e_t^2, \ldots, e_t^n$ indicate similarity between speech determined by the audio spectrum characteristic $S_{t-1}$ and speech determined by the respective mouth shape characteristics $x_1, x_2, \ldots, x_n$.

The scores $e_t^1, e_t^2, \ldots, e_t^n$ are calculated by an AI model which is trained to receive the audio spectrum characteristic $S_{t-1}$ and the respective mouth shape characteristics $x_1, x_2, \ldots, x_n$, and to calculate and output the scores $e_t^1, e_t^2, \ldots, e_t^n$ based on the correlations therebetween.

In addition, weights $a_t^1, a_t^2, \ldots, a_t^n$ to be applied to the respective mouth shape characteristics $x_1, x_2, \ldots, x_n$ are calculated by using the calculated scores $e_t^1, e_t^2, \ldots, e_t^n$.

The weights $a_t^1, a_t^2, \ldots, a_t^n$ are calculated by using an AI model which is trained to receive the calculated scores $e_t^1, e_t^2, \ldots, e_t^n$ and to calculate and output the weights $a_t^1, a_t^2, \ldots, a_t^n$ to be applied to the respective mouth shape characteristics $x_1, x_2, \ldots, x_n$.

Next, a weight sum $Z_t$ of the scores $e_t^1, e_t^2, \ldots, e_t^n$ is calculated by using the calculated weights $a_t^1, a_t^2, \ldots, a_t^n$. The weight sum $Z_t$ may be calculated by the following equation:

$$Z_t = \sum_{i=1}^{n} a_t^i x_i$$

By calculating the scores, the weights, and the weight sum, speech having the highest whole similarity (correlation) according to the video and time can be synthesized. A single AI model which performs all of the corresponding processes may be configured and utilized.

Thereafter, an audio spectrum characteristic $S_t$ used to generate an audio to be added to a video at a time t is generated by using the audio spectrum characteristic $S_{t-1}$ and the calculated weight sum $Z_t$.

In addition, an audio $y_t$ until the time t is generated by adding an audio generated by using the audio spectrum characteristic $S_t$ to an audio $y_{t-1}$ until the time t−1, by calculating a weight sum.

The synthesized speech is combined with the video by adding the audio $y_t$ until the time t to a video $v_t$ until the time t.

Figure 2:
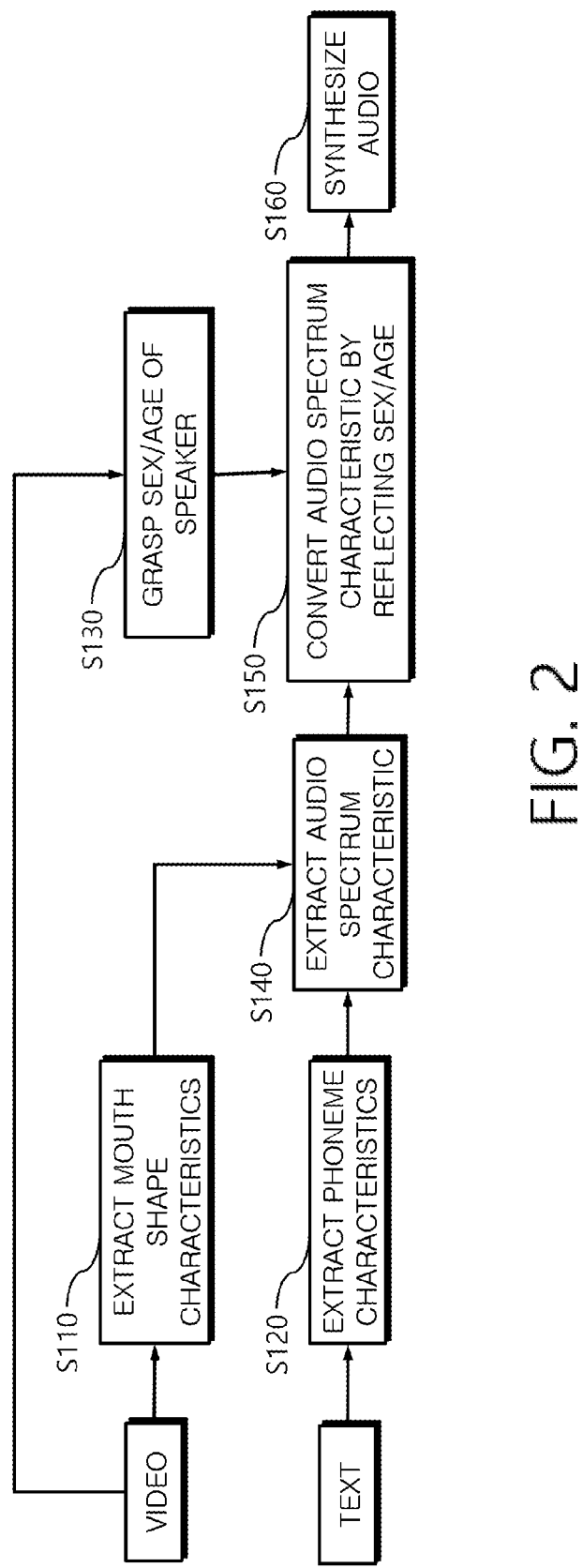
FIG. 2 is a view provided to explain a speech synthesis method according to another embodiment of the present disclosure.

FIG. 2 is a view provided to explain a speech synthesis method according to another embodiment. The speech synthesis method according to another embodiment synthesizes speech according to a length of a video and the shape of mouth of a speaker as well as sex and age of the speaker.

To achieve this, mouth shape characteristics of a speaker are extracted from an input video (S110), and phoneme characteristics are extracted from an input text (S120). The extraction of the mouth shape characteristics and the extraction of the phoneme characteristics have been described above, and thus a detailed description thereof is omitted.

In an embodiment, the sex and age of the speaker in the input video are grasped (S130). The sex and age of the speaker may be grasped by an AI model which is trained to receive a face image and/or a body image of a speaker, to infer the sex and age by analyzing the face image and/or the body image, and to output the sex and age.

Next, by calculating scores, weights, and a weight sum, an audio spectrum characteristic having the highest whole similarity (correlation) according to the video and time is extracted (S140). These processes have been described above, and thus a detailed description thereof is omitted.

Thereafter, the audio spectrum characteristic synthesized at step S140 is converted by reflecting the sex and age of the speaker grasped at step S130 (S150).

In addition, an audio is generated by using the converted audio spectrum characteristic and the weight sum (S160). The process of generating the audio has been described above, and thus a detailed description thereof is omitted. The generated audio is added to the video.

Figure 3:
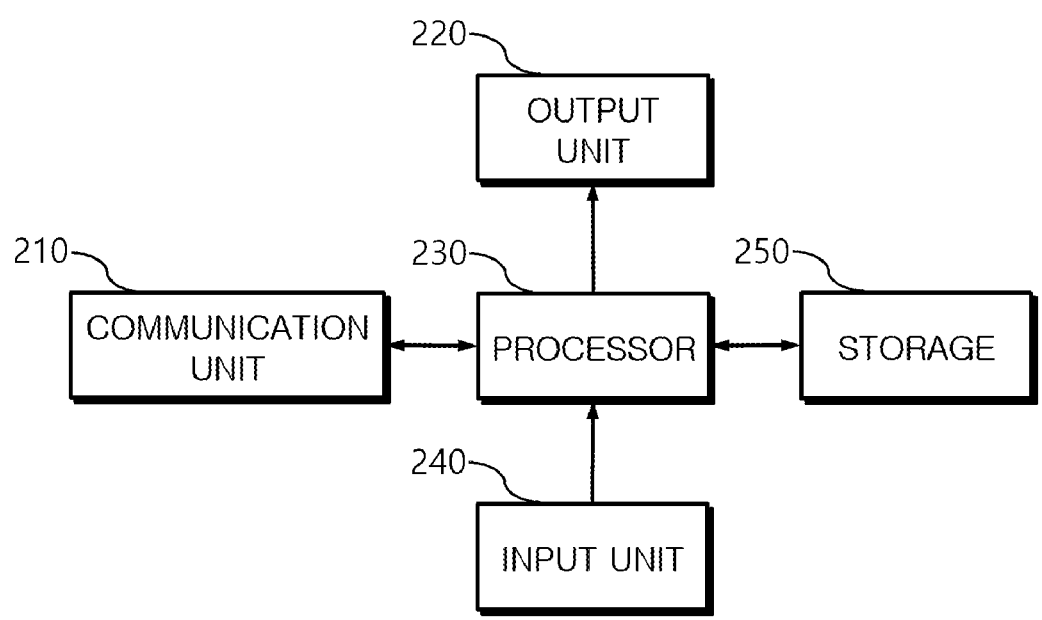
FIG. 3 is a block diagram of a speech synthesis system according to still another embodiment of the present disclosure.

FIG. 3 is a block diagram of a speech synthesis system according to still another embodiment. The speech synthesis system according to still another embodiment may be implemented by using a computing system including a communication unit 210, an output unit 220, a processor 230, an input unit 240, and a storage 250 as shown in FIG. 3.

The communication unit 210 is a communicating means for receiving input of a video and a text from an external apparatus and an external network.

The input unit 240 is an input means for receiving input of a user setting command, and the output unit 220 includes a display and a speaker for outputting a speech synthesis process and a result thereof, a video, a video added with synthesized speech, or the like.

The processor 230 may synthesize speech by executing the method illustrated in FIG. 1 or 2.

The storage 250 provides a storage space necessary for the operations of the processor 230. In addition, the storage 250 may store videos and texts.

Up to now, the audio synthesis method and system adapted to video characteristics have been described with reference to preferred embodiments.

In the above-described embodiments, a method for synthesizing speech according to the shape of mouth of a speaker has been suggested. However, the embodiments can be applied to other situations. For example, the embodiments of the present disclosure can be applied to methods for synthesizing an audio rather than speech, based on a movement speed of a screen, a change in color of the screen, or the like.

In the embodiments of the present disclosure, an audio is synthesized/converted according to input video characteristics, and a content can be easily created.

The technical idea of the present disclosure may be applied to a computer-readable recording medium which records a computer program for performing functions of the apparatus and method according to the present embodiments. In addition, the technical idea according to various embodiments of the present disclosure may be implemented in the form of a computer-readable code recorded on a computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer-readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. An audio synthesis method comprising:
   receiving an input of a video;
   receiving an input of a text;
   extracting characteristics x from the video in a time-series way;
   extracting characteristics p of phonemes from the text; and
   generating an audio spectrum characteristic $S_t$ at a time t used to generate an audio to be synthesized with a video at the time t, based on correlations between an audio spectrum characteristic $S_{t-1}$ at a time t−1, which is used to generate an audio to be synthesized with a video at the time t−1, and the characteristics x.

2. The method of claim 1, wherein the generating comprises:
   a first calculation step of calculating scores e based on the correlations between the audio spectrum characteristic $S_{t-1}$ used to generate the audio to be synthesized with the video at the time t−1, and the respective characteristics x; and
   a first generation step of generating the audio spectrum characteristic $S_t$ by using the calculated scores e.

3. The method of claim 2, wherein the first calculation step is performed by using an AI model which is trained to receive the audio spectrum characteristic $S_{t-1}$ and the respective characteristics x, and to calculate and output the scores e based on the correlations therebetween.

4. The method of claim 2, wherein the first generation step comprises:
   a second calculation step of calculating weights a to be applied to the characteristics x by using the calculated scores e; and
   a second generation step of generating the audio spectrum characteristic $S_t$ by using the calculated weights a.

5. The method of claim 4, wherein the second calculation step is performed by using an AI model which is trained to receive the calculated scores e and to calculate and output the weights a to be applied to the characteristics x.

6. The method of claim 4, wherein the second generation step comprises:
   calculating a weight sum $Z_t$ of the scores e by using the calculated weights a; and
   generating the audio spectrum characteristic St used to generate the audio to be synthesized with the video at the time t, by using the audio spectrum characteristic $S_{t-1}$ and the weight sum $Z_t$.

7. The method of claim 6, further comprising generating an audio $y_t$ until the time t by adding an audio generated by using the audio spectrum characteristic St to an audio $y_{t-1}$ until the time t−1.

8. The method of claim 7, further comprising adding the audio $y_t$ until the time t to a video until the time t.

9. The method of claim 6, further comprising converting the generated audio spectrum $S_t$.

10. An audio synthesis system comprising:
    an input unit configured to receive input of a video and a text; and
    a processor configured to:
    extract characteristics x from the video in a time-series way;
    extract characteristics p of phonemes from the text; and
    generate an audio spectrum characteristic $S_t$ at a time t used to generate an audio to be synthesized with a video at the time t, based on correlations between an audio spectrum characteristic $S_{t-1}$ at a time t−1, which is used to generate an audio to be synthesized with a video at the time t−1, and the characteristics x.

11. An audio synthesis method comprising:
extracting characteristics x from a video in a time-series way;
extracting characteristics p of phonemes from a text; and
generating an audio spectrum characteristic $S_t$ used to generate an audio to be synthesized with a video at a time t, based on correlations between an audio spectrum characteristic $S_{t-1}$, which is used to generate an audio to be synthesized with a video at a time t−1, and the characteristics x.

* * * * *